(No Model.)
J. B. RUNK.
WATER REGULATOR.
No. 586,398. Patented July 13, 1897.
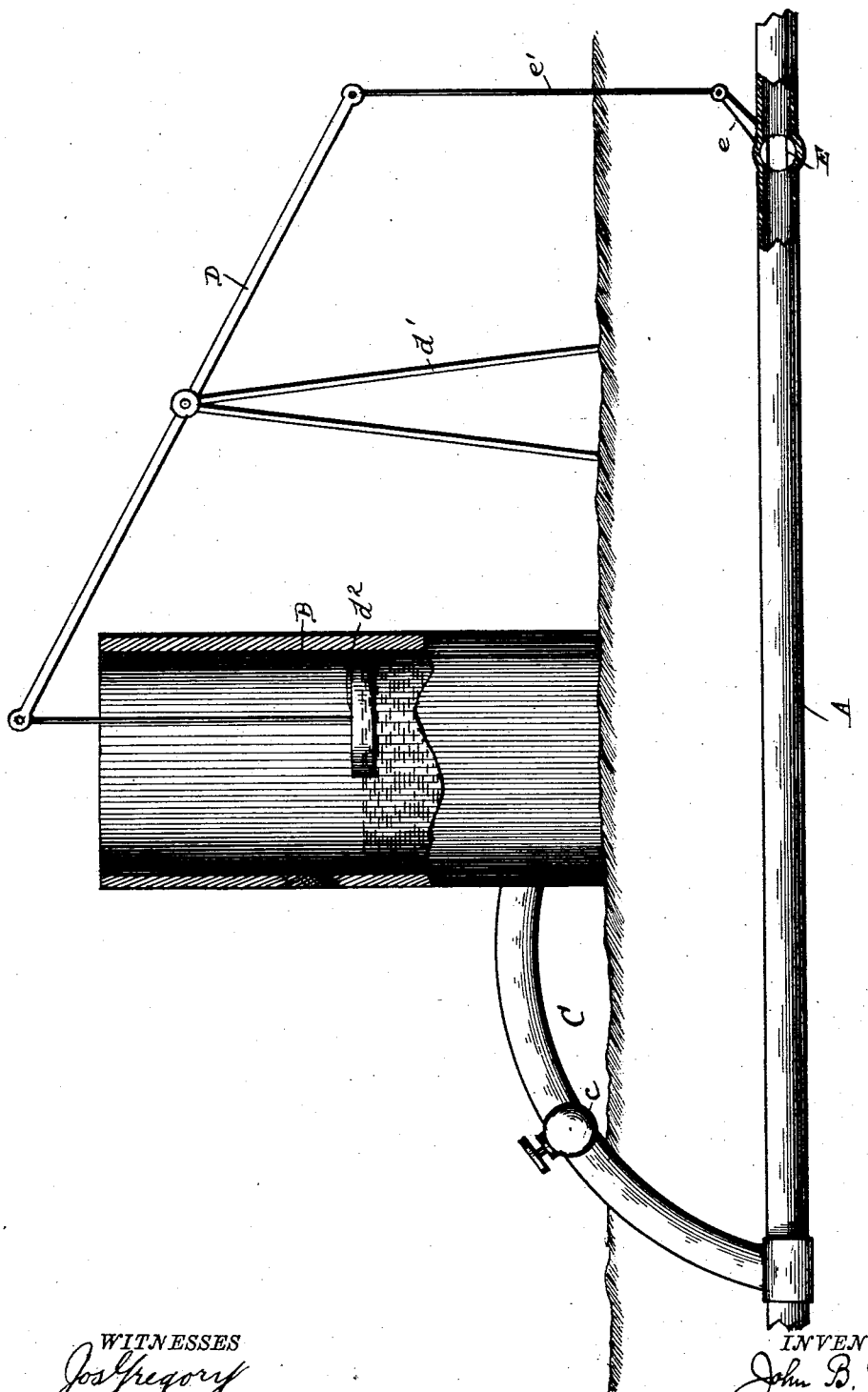
WITNESSES
Jos Gregory
J. C. Tappan
INVENTOR,
John B. Runk.
by John Wedderburn
Attorney

UNITED STATES PATENT OFFICE.

JOHN B. RUNK, OF LAMESA, CALIFORNIA.

WATER-REGULATOR.

SPECIFICATION forming part of Letters Patent No. 586,398, dated July 13, 1897.

Application filed September 30, 1896. Serial No. 607,486. (No model.)

*To all whom it may concern:*

Be it known that I, JOHN B. RUNK, a citizen of the United States, residing at Lamesa, in the county of San Diego and State of California, have invented certain new and useful Improvements in Water-Regulators; and I do hereby declare the following to be a full, clear, and exact description of the invention, such as will enable others skilled in the art to which it appertains to make and use the same.

This invention relates to improvements in apparatus for preventing excesses and undue pressure in pipe systems.

The invention consists of certain novel constructions, combinations, and arrangements of parts, all of which will be hereinafter more fully described and claimed.

In the accompanying drawing, forming part of this specification, the figure represents a side elevation of the devices embodying my invention, the same being partly broken away.

A in the drawing represents the main pipe of the water system; B, the stand-pipe; C, the backwater-pipe connecting the main pipe with the stand-pipe; D, the operating-lever, and E the valve. The said valve E may be of either the sliding or rotatable type, but is preferably the latter, as shown. This valve is provided with a projecting angular valve-stem $e$, that is connected to the operating end of the lever D by means of a pivoted rod $e'$. The said lever D is mounted upon a fulcrum $d'$ and is connected at its forward end to a float $d^2$, adapted to rise and fall within the stand-pipe D as the water in the same ascends or descends. The said stand-pipe B is connected to the main pipe A forward of the valve E and is provided with a globe-valve $c$, by means of which the admission of the water from the main pipe to the stand-pipe may be regulated at will.

It will be observed from the foregoing description that should the pressure in the main pipe A become abnormal through any cause, such as a steep grade or an excess of supply, the backwater will force past the valve $c$ and into the stand-pipe B, and thereby raise the float $d^2$ at the forward end of the lever D, depress the rear end of the lever D, and operate the rotatable valve E to close the same and cut off the supply of water. As the pressure in the pipe A decreases the water in the stand-pipe B is lowered, thus operating the lever D to again open the rotatable valve E and permit the water to flow.

By regulating the globe-valve $c$ to the desired degree the rapidity with which the regulating device will respond to the increased or decreased pressure within the pipe may be regulated.

Having thus described my invention, what I claim as new, and desire to secure by Letters Patent, is—

1. In a pressure-regulating apparatus for pipe systems, the combination with the main pipe, of a rotatable valve mounted therein, an open stand-pipe, a backwater-pipe connecting said stand-pipe and the main pipe forward of the rotatable valve, a float mounted in said stand-pipe, a pivoted lever connected to said float, and a rod connecting said lever and the rotatable valve, whereby the latter will be opened or closed according to the height of the water within the stand-pipe, substantially as described.

2. In a pressure-regulating apparatus for pipe systems, the combination with a main pipe, a rotatable valve mounted therein, an open stand-pipe, a backwater-pipe connecting said stand-pipe and the main pipe forward of the rotatable valve, a regulating-valve in said backwater-pipe to govern the discharge of water therethrough into the stand-pipe, a float in said stand-pipe, a pivoted lever connected to said float, and a rod connecting said lever and said rotatable valve, whereby the latter is opened or closed by the rising or falling of the float within the stand-pipe, substantially as described.

In testimony whereof I have signed this specification in the presence of two subscribing witnesses.

JOHN B. RUNK.

Witnesses:
ASA L. SKINNER,
W. L. KEENEY.